United States Patent [19]

Solheim

[11] Patent Number: 5,596,812
[45] Date of Patent: Jan. 28, 1997

[54] GROOVE DEPTH GAUGE FOR GOLF CLUB HEADS

[75] Inventor: John A. Solheim, Phoenix, Ariz.

[73] Assignee: Karsten Manufacturing Corporation, Phoenix, Ariz.

[21] Appl. No.: 522,961

[22] Filed: Sep. 1, 1995

[51] Int. Cl.$^6$ .................................................. G01B 5/18
[52] U.S. Cl. .......................................... 33/508; 33/836
[58] Field of Search ................... 33/508, 836; 473/282, 473/408

[56] References Cited

U.S. PATENT DOCUMENTS

| | | | |
|---|---|---|---|
| 2,445,060 | 7/1948 | Gearhart | 33/836 |
| 2,654,156 | 10/1953 | Boyer | 33/836 |
| 3,763,515 | 10/1973 | Voss | 473/408 |
| 4,321,752 | 3/1982 | Kaufman | 33/836 |
| 4,580,350 | 4/1986 | Fincher | 33/508 |
| 4,908,899 | 3/1990 | Killen | 473/408 |
| 5,121,519 | 6/1992 | Haugom | 473/408 |
| 5,226,647 | 7/1993 | Notarmuzi | 473/408 |

*Primary Examiner*—Thomas B. Will
*Attorney, Agent, or Firm*—Darrell F. Marquette; Herbert E. Haynes, Jr.

[57] ABSTRACT

A gauge for accurately measuring depths of grooves formed in a face of a golf club head. The gauge includes a disk with a diameter of approximately one-half inch and a thickness of approximately one-eighth inch. The gauge also includes a ridge that extends across a flat surface on the disk. When the gauge is used, it is positioned so that the ridge is inserted in a groove in a club head face. If the ridge contacts the bottom of the groove, the disk will not lie flush against the club head face but will rock back and forth on the club head face thereby indicating that the groove conforms with the Rules of Golf as approved by The United States Golf Association.

6 Claims, 1 Drawing Sheet

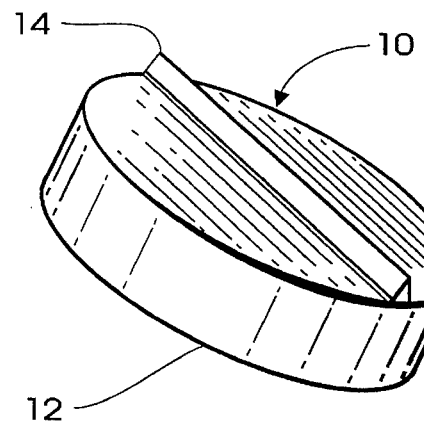
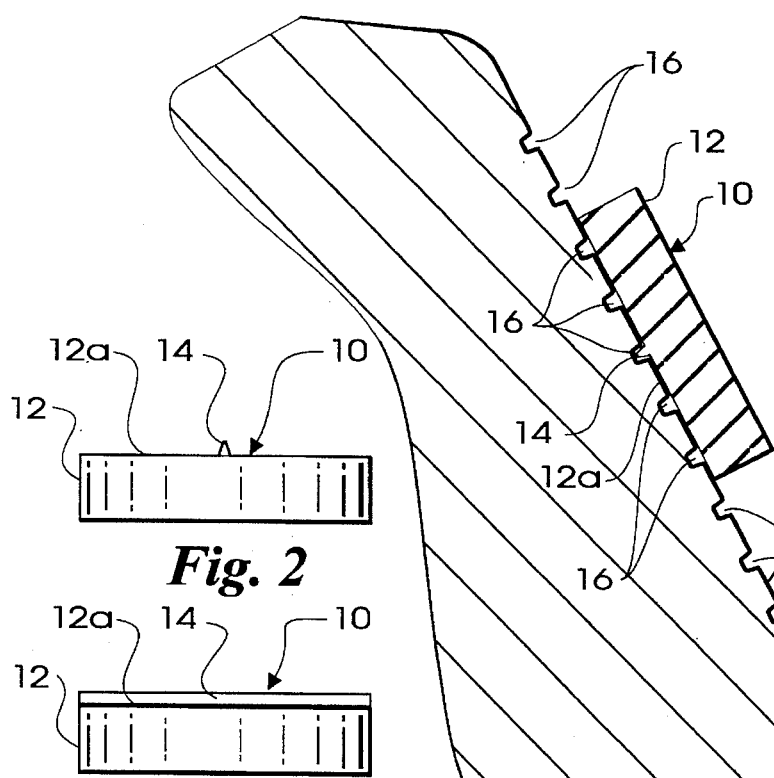
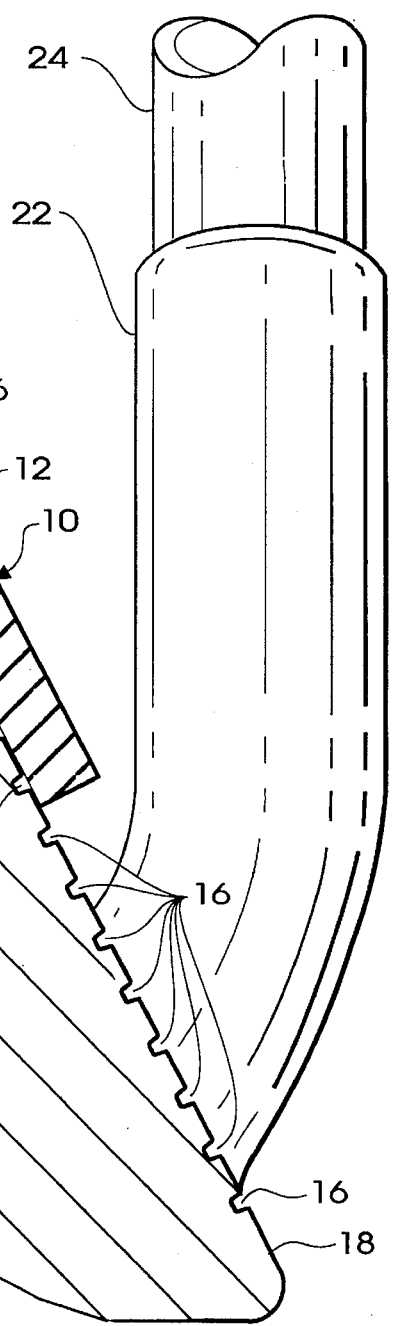
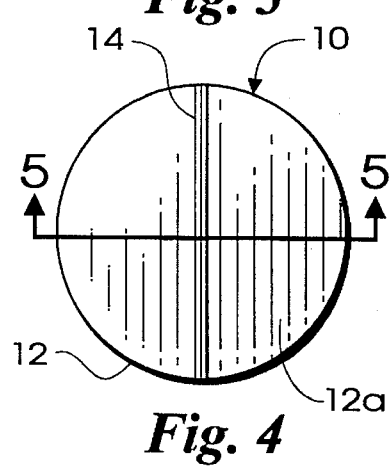
Fig. 1
Fig. 2
Fig. 3
Fig. 4
Fig. 5

GROOVE DEPTH GAUGE FOR GOLF CLUB HEADS

BACKGROUND OF THE INVENTION

This invention relates generally to golf equipment and, in particular, to a groove depth gauge for golf club heads.

Golf clubs consist of a shaft, a head attached to one end of the shaft, and a grip attached to the other end of the shaft. The club head has a face for impacting a golf ball with a series of straight grooves extending across its face. The Rules of Golf as approved by The United States Golf Association (USGA) require that the grooves formed in the club head face have a depth that does not exceed 0.020 inch. If a golf club head has grooves that exceed 0.020 inch in depth, it does not conform with the USGA rules while a golf club head with grooves that measure 0.020 inch or less in depth are in conformance with the USGA rules.

In the past, it has been difficult to accurately measure groove depths in club head faces. Therefore, a need exists for a gauge for accurately measuring such groove depths.

SUMMARY OF THE INVENTION

The present invention provides a gauge for measuring depths of a plurality of grooves formed in a face of a golf club head. The gauge comprises a base having a generally flat surface, and a ridge extending across the flat surface of the base. The ridge has a vertical height and is adapted for insertion into one of the grooves whereby the flat surface of the base lies flush against the face of the golf club head in the event the one groove has a depth that is greater than the vertical height of the ridge. In the preferred embodiment of the gauge, the vertical height of the ridge is 0.021 inch, and the base is a disk with a diameter of approximately one-half inch and a thickness of approximately one-eighth inch.

DESCRIPTION OF THE DRAWINGS

FIG. 1 is a perspective view of a groove depth gauge according to the preferred embodiment of the present invention;

FIGS. 2 and 3 are side elevational views of the groove depth gauge shown in FIG. 1;

FIG. 4 is a top plan view of the groove depth gauge shown in FIG. 1; and

FIG. 5 is a cross sectional view of the groove depth gauge taken along lines 5—5 in FIG. 4 while the gauge is being used to measure a groove depth.

DESCRIPTION OF THE PREFERRED EMBODIMENT

Referring to FIGS. 1–4, a groove depth gauge 10 includes a base in disk 12 and a ridge 14 extending diametrically across a generally flat surface 12a of the disk 12. In the preferred embodiment of the gauge 10, the disk 12 has a diameter of approximately one-half inch and a thickness of approximately one-eighth inch. The ridge 14 extends upwardly from the flat surface 12a of the disk 12 and is substantially V-shaped as seen in FIG. 2 with a vertical height of 0.021 inch.

In use, the gauge 10 is positioned as shown in FIG. 5 so that the ridge 14 is inserted in a groove 16 formed in a face 18 of a golf club head 20. It will be understood that the golf club head 20 has a series of straight grooves 16 extending across its face 18, and a hosel 22 on the golf club head 20 receives one end of a shaft 24. If the groove 16 in which the ridge 14 is disposed has a depth of 0.021 inch or more, the flat surface 12a of the disk 12 lies flush against the face 18 and indicates that the groove 16 does not conform with the USGA Rules of Golf. If the groove 16 in which the ridge 14 is disposed has a depth that measures 0.020 inch or less, the disk 12 will rock back and forth on the face 18 because the ridge 14 will contact the bottom of the groove 16 thereby indicating that the groove 16 conforms with the USGA Rules of Golf.

What is claimed is:

1. A gauge for measuring depths of a plurality of grooves formed in a face of a golf club head, each of said grooves having a maximum depth, said gauge comprising:

a base having a generally flat surface;

a single ridge extending across said flat surface of said base, said single ridge having a vertical height and being adapted for insertion into one of said grooves whereby said flat surface of said base lies flush against the face of the golf club head in the event the maximum depth of said one groove is greater than said vertical height of said single ridge; and the vertical height of said single ridge being correlated to the maximum depth of each of said grooves such that the maximum depth of each of said grooves may be checked to determine if the maximum depth of each of said grooves conforms to a preselected maximum depth.

2. The gauge of claim 1, wherein said vertical height of said ridge is 0.021 inch.

3. The gauge of claim 1, wherein said base comprises a disk with a diameter of approximately one-half inch.

4. The gauge of claim 3, wherein said disk has a thickness of approximately one-eighth inch.

5. The gauge of claim 2, wherein said preselected maximum depth is 0.020 inch.

6. The gauge of claim 2, wherein said preselected maximum depth is less than 0.020 inch.

* * * * *